United States Patent [19]

Scharf

[11] 4,410,207
[45] Oct. 18, 1983

[54] BUMPER STRUCTURE FOR VEHICLE HAVING TILTABLE LOAD CARRIER MEMBER

[75] Inventor: Heino W. Scharf, Knoxville, Tenn.

[73] Assignee: Dempster Systems Inc., Knoxville, Tenn.

[21] Appl. No.: 332,741

[22] Filed: Dec. 21, 1981

[51] Int. Cl.³ .............................................. B60R 19/02
[52] U.S. Cl. .................................. 293/118; 298/17 R
[58] Field of Search ...................... 293/34, 118, 15, 17; 298/1 R, 17 R

[56] References Cited

U.S. PATENT DOCUMENTS

| | | | |
|---|---|---|---|
| 2,683,545 | 7/1954 | Wood | 214/501 |
| 2,990,212 | 6/1961 | Nicastro | 293/34 |
| 3,421,793 | 1/1969 | Pioch | 298/17 |
| 3,533,654 | 10/1970 | Kannegieter | 293/118 |
| 3,847,427 | 11/1974 | Eshelman | 293/119 |
| 3,871,695 | 3/1975 | Koenig | 293/118 |
| 3,913,963 | 10/1975 | Persicke | 293/118 |
| 3,923,330 | 12/1975 | Viall et al. | 293/118 |
| 4,026,590 | 5/1977 | Holm | 293/73 |
| 4,305,694 | 12/1981 | Chan | 293/118 |

Primary Examiner—Richard A. Bertsch
Attorney, Agent, or Firm—Jacox & Meckstroth

[57] ABSTRACT

Bumper structure for a vehicle having a load carrier member which is angularly movable from a horizontal position to an inclined position. The bumper structure is pivotally attached to the frame of the vehicle and to the load carrier member. The bumper structure is in an active obstructive condition when the load carrier member is horizontal and is in an inactive, retracted, unobstructive condition when the load carrier member is angularly inclined.

6 Claims, 6 Drawing Figures

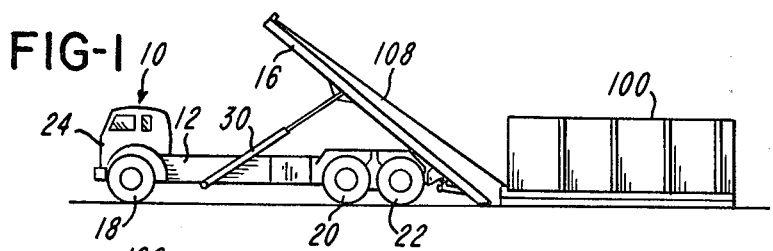
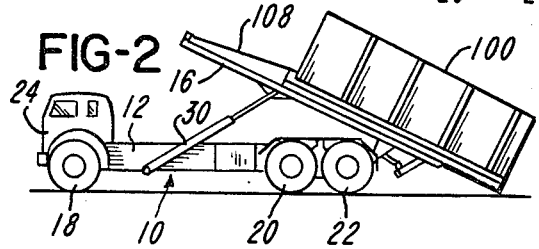
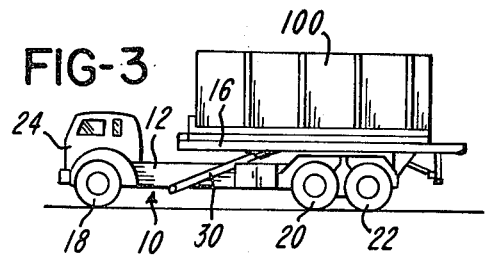
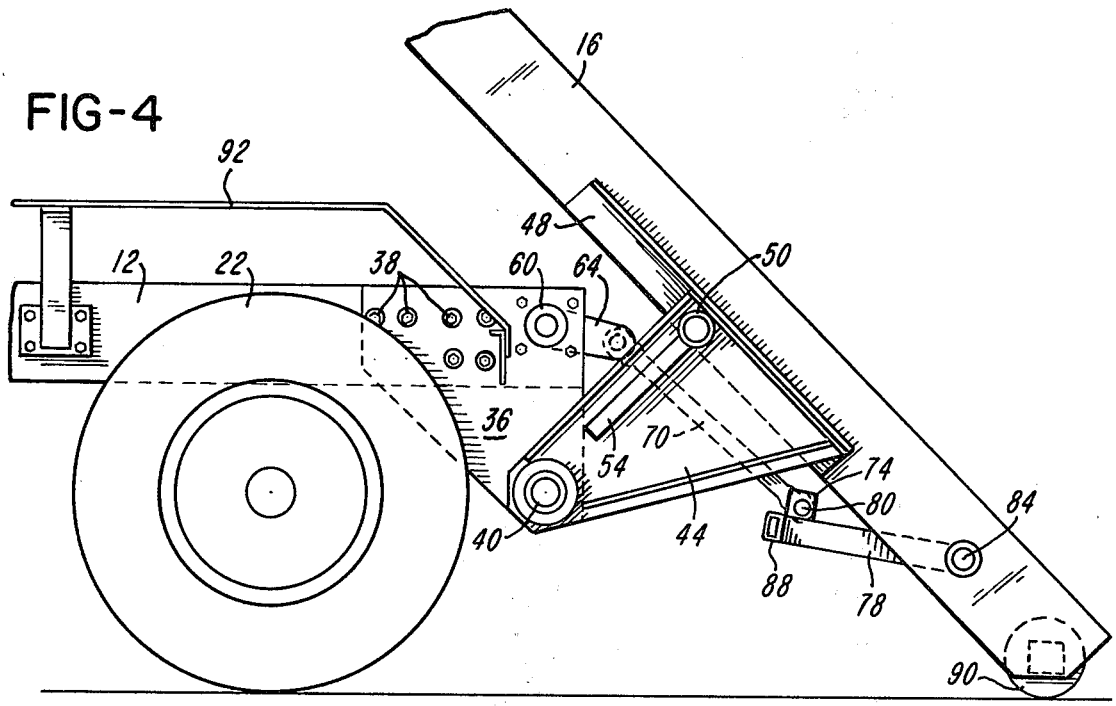
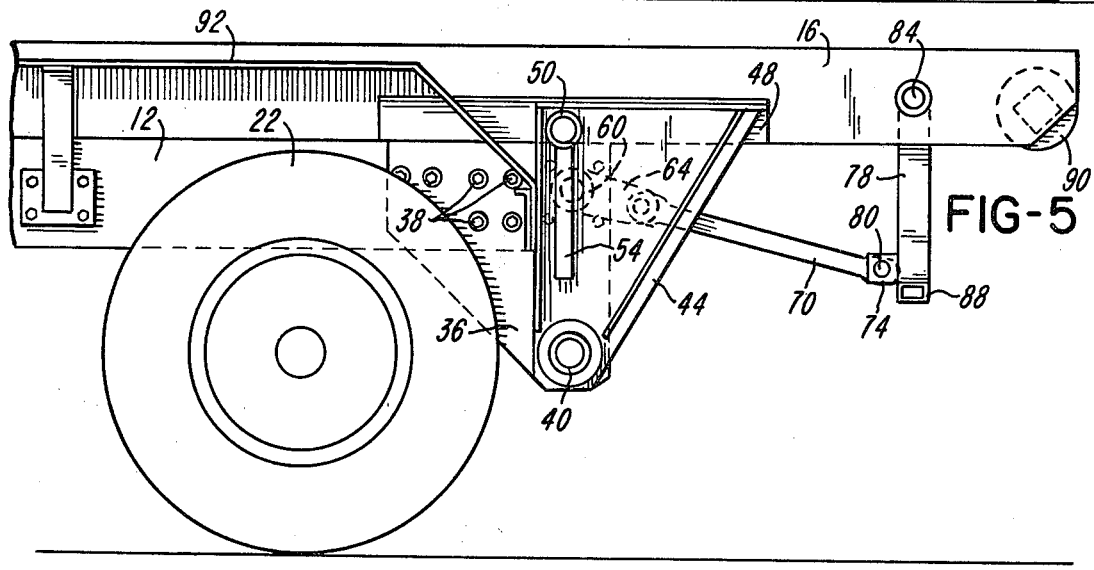

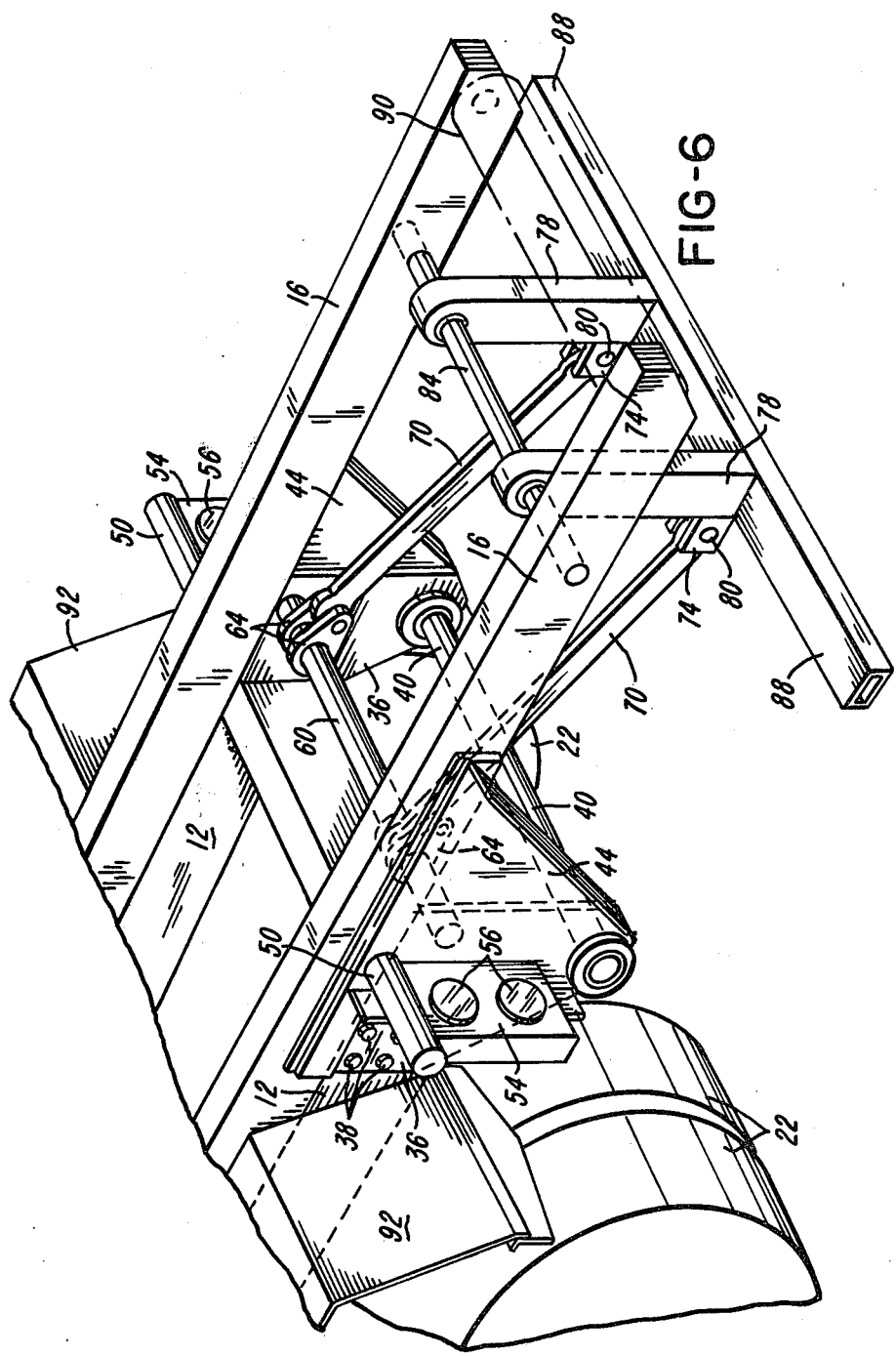

BUMPER STRUCTURE FOR VEHICLE HAVING TILTABLE LOAD CARRIER MEMBER

BACKGROUND OF THE INVENTION

Several types of load carrier vehicles are provided with a load carrier member which is tiltable to receive a load and to discharge a load. If such a vehicle travels on the highways and streets, it is necessary for the vehicle to include a bumper to protect other vehicles. Ordinarily, the only suitable location for a bumper is as a part of the tiltable load carrier member. A problem exists, however, in that a bumper fixedly attached to the tiltable load carrier member may engage the surface upon which the vehicle is supported and interferes with the tilting of the load carrier member.

Known vehicles with a tiltable load carrier member and a bumper attached thereto have means to move the bumper from its active or extended position to permit the tilting load carrier member to tilt to its maximum position without interference by the bumper. Such means for moving the bumper have required separate actuator members for moving the bumper from its active extended position to an inactive retracted position.

It is an object of this invention to provide bumper structure as a part of a tiltable load carrier member in which the bumper structure automatically adjusts from an active extended condition to an inactive retracted condition as the tiltable load carrier member is angularly moved.

It is another object of this invention to provide such bumper structure which can be constructed sturdily with minimum costs.

Other objects and advantages of this invention reside in the construction of parts, the combination thereof, the method of production and the mode of operation, as will become more apparent from the following description.

SUMMARY OF THE INVENTION

Bumper structure of this invention for a vehicle having a tiltable load carrier member comprises arm members pivotally attached to the tiltable load carrier member, an elongate bar or the like attached to the arm members and linkage means pivotally attached to the arm members and to the frame of the vehicle. The bumper structure is automatically adjusted from an active or extended or obstructive condition to an inactive or retracted or unobstructive condition as the tilting load carrier member angularly moves from a horizontal position to its maximum angular position.

BRIEF DESCRIPTION OF THE VIEWS OF THE DRAWING

FIG. 1 is a side elevational view of a load carrier vehicle having a tiltable load carrier member and illustrating the load carrier member in its maximum angular position, as in preparation for receiving a load.

FIG. 2 is a side elevational view, similar to FIG. 1, illustrating the load carrier member angularly moving from its maximum inclined position toward its horizontal position, as the load carrier member receives a load.

FIG. 3 is a side elevational view, similar to FIGS. 1 and 2, illustrating the load carrier member in its horizontal position with a load upon the load carrier member.

FIG. 4 is a fragmentary side elevational view of the rear portion of the load carrier member, illustrated in FIGS. 1, 2 and 3, but drawn on a much larger scale than FIGS. 1, 2 and 3 and showing the bumper structure of this invention in its inactive retracted condition as the tiltable load carrier member is in its maximum angular position.

FIG. 5 is a fragmentary side elevational view similar to FIG. 4 and drawn on substantially the same scale as FIG. 4, and showing the bumper structure in its active obstructive condition.

FIG. 6 is a fragmentary perspective view drawn on substantially the same scale as FIGS. 4 and 5 and showing the bumper structure in its active extended, obstructive condition, as the tiltable load carrier member is in its horizontal position.

DETAILED DESCRIPTION OF THE INVENTION

FIGS. 1, 2 and 3 illustrate a load carrier vehicle 10 having a frame 12 and a tiltable load carrier member 16. The vehicle 10 has front wheels 18, and rear wheels 20 and 22. The vehicle 10 also includes a cab 24.

Linearly operable hydraulic motors 30 are pivotally attached to the frame 12 and to the load carrier member 16 for pivotal movement thereof. FIGS. 4, 5 and 6 show plates 36 which are secured to the frame 12 by means of bolts 38, there being one plate 36 at each of the opposite sides of the frame 12.

Pivotally attached to each plate 36 by means of a shaft 40 is a plate 44. The shaft 40 extends between the plates 44 and the plates 36. Each plate 44 is secured to the load carrier member 16 by means of a channel 48. Thus the load carrier member 16 is pivotally attached to the frame 12 and is pivotally movable about an axis spaced from the frame 12 and from the load carrier member 16.

Attached to each plate 44 and extending laterally therefrom is a pin 50 to which is attached a bracket 54, to which is attached a pair of light reflector members 56. The bracket 54 is also attached to the plate 44 and angularly movable therewith.

As best shown in FIG. 6, extending between the plates 36 and attached thereto is a shaft 60. Attached to the shaft 60 are pairs of connector members 64. Pivotally attached to each pair of connector members 64 is an elongate link member 70. The link members 70 extend from the connector members 64 and from the shaft 60 to connector members 74 which are attached to arms 78. Each of the link members 70 is pivotally attached by means of a pin 80 to a pair of the connector members 74.

The arms 78 are pivotally attached to a shaft 84 which extends between spaced-apart portions of the load carrier member 16 and is attached thereto. Secured to the arms 78 adjacent the connector members 74 is an elonate bar member 88.

Shown in FIGS. 4 and 5, rotatably attached to spaced-apart portions of the load carrier member 16 at the rear portion thereof, is a roller 90.

Attached to the frame 12 and extending over the wheels 20 and 22 is a fender 92.

Operation

FIGS. 3, 5 and 6 show the load carrier member 16 in its horizontal position for carrying a load, such as a load 100. In the horizontal position of the load carrier member 16, the arms 78 are substantially vertical and are shown at right angles to the load carrier member 16. Also the bar member 88 is below the shaft 84, as illustrated in FIG. 5. The link members 70 provide bracing and stabilizing forces upon the arms 78. Thus, the bar member 88 and the arms 78 are in an active or obstructive or extended condition engageable by a smaller vehicle to protect the smaller vehicle by preventing such a smaller vehicle from traveling under the load carrier member 16.

When it is desired to move a load, such as the load 100, upon the load carrier member 16, the vehicle 10 is positioned adjacent the load 100 and the hydraulic motors 30 are operated to tilt the load carrier member 16 to its maximum angular position, as illustrated in FIGS. 1 and 4. In this tilted position of the load carrier member 16, the roller 90 is in engagement with the surface upon which the vehicle 10 is supported.

As the load carrier member 16 is angularly moved from the horizontal position thereof, shown in FIGS. 3, 5 and 6, to its maximum angular position, shown in FIGS. 1 and 4, the link members 70 and the arms 78 pivotally move.

When the load carrier member 16 is angularly moved from its horizontal position shown in FIG. 5 to its maximum angular position shown in FIG. 4, the angular positions of the link members 70 and the arms 78 change from those shown in FIG. 5 to the angular positions thereof shown in FIG. 4. Thus, the link members 70 move angularly and draw the arms 78 from the positions thereof at right angles to the load carrier member 16, and the arms 78 are angularly moved with respect to the load carrier member 16, and the bar member 88 is moved toward the plates 44. If the arms 78 and the bar member 88 were not so moved, the bar member 88 would engage the surface upon which the vehicle 10 is supported when the load carrier member 16 is tilted to its maximum angular position shown in FIGS. 1 and 4.

As illustrated in FIGS. 1, 2 and 3, when a load, such as the load 100, is drawn onto the load carrier member 16 by a cable 108, shown in FIGS. 1 and 2, and by motor means, not shown, the load carrier member 16 is angularly moved from the angular position thereof, illustrated in FIGS. 1 and 4, to its horizontal position, illustrated in FIGS. 3, 5 and 6. When this angular movement of the load carrier member 16 occurs, the link members 70 and the arms 78 are pivotally moved, to again position the arms 78 at right angles to the load carrier member 16, and the bar member 88 is positioned below the shaft 84. Thus, the bar member 88 and the arm members 78 are again positioned to their active or extended or obstructive positions to serve as abutment members under the load carrier member 16.

Thus, it is understood that the bumper structure of this invention automatically adjusts from an active, obstructive, abutment condition to an inactive, unobstructive, retracted condition as the load carrier member angularly moves from a horizontal position to its maximum inclined position.

Although the preferred embodiment of the bumper structure of this invention has been described, it will be understood that within the purview of this invention various changes may be made in the form, details, proportion and arrangement of parts, the combination thereof, and the mode of operation, which generally stated consist in a bumper structure within the scope of the appended claims.

The invention having thus been described, the following is claimed:

1. In a vehicle provided with a frame and a load carrier member which is angularly movable between a horizontal position and an inclined position with respect to the frame, automatically retractable bumper structure comprising:

a pair of arm members pivotally joined to the load carrier member and extending therefrom, an engagement member attached to the arm members, a pair of link members, means pivotally attaching the arm members to the link members and means pivotally attaching the link members to the frame, the arm members extending downwardly from the load carrier member when the load carrier member is in its horizontal position, the arm members and the engagement member thus being in an obstructive position when the load carrier member is horizontal, the arm members being automatically pivotally movable from an obstructive position to an unobstructive position for movement of the engagement member from an obstructive position to an unobstructive position as the arm members and the link members automatically pivotally move with pivotal movement of the load carrier member from a horizontal position to an inclined position.

2. A vehicle of the type provided with a frame, a pair of first plate members, the first plate members being attached to the frame and extending therefrom, a load carrier member, a pair of second plate members attached to the load carrier member and extending therefrom, means pivotally attaching together the first plate members and the second plate members at a position spaced from the frame and spaced from the load carrier member, the load carrier member thus being pivotally movable with respect to the frame and pivotally movable about an axis spaced from the frame and spaced from the load carrier member, as the load carrier member moves from a horizontal position to an inclined position, the improvement comprising:

a link member, means pivotally connecting the link member to the frame as the link member extends from the frame, an arm member pivotally attached to the load carrier member at a position spaced from the plate members, an engagement member attached to the arm member, means pivotally attaching the link member to the arm member, the arm member, with the engagement member attached thereto, being in an active extended position from the load carrier member and in an obstructive position when the load carrier member is in its horizontal position, the arm member and the link member being automatically pivotally movable with pivotal movement of the load carrier member, to move the arm member and the engagement member from an active obstructive position to a retracted unobstructive position adjacent the load carrier member as the load carrier member moves from its horizontal position to its inclined position.

3. The vehicle of claim 2 in which the engagement member is an elongate bar extending transversely with respect to the arm member.

4. A vehicle of the type provided with a frame member and a load carrier member which is pivotally attached to the frame member, the load carrier member being movable between a horizontal position and an inclined position, comprising:

bumper structure, means pivotally attaching the bumper structure to the load carrier member so that the bumper structure extends downwardly from the load carrier member in an obstructive position when the load carrier member is in its horizontal position, linkage means, means pivotally attaching the linkage means to the frame and to the bumper structure, the linkage means and the bumper structure being automatically pivotally movable to adjust the bumper structure from its downward obstructive position to a retracted unobstructive position as the load carrier member pivotally moves from its horizontal position to its inclined position.

5. The vehicle of claim 4 in which the bumper structure comprises a plurality of arm members and a bar member attached to the arm members, the arm members being pivotally attached to the load carrier member.

6. The vehicle of claim 4 in which the bumper structure comprises an arm member pivotally attached to the load carrier member and a bar member attached to the arm member and extending transversely with respect thereto.

* * * * *